United States Patent
Boettner

(10) Patent No.: US 10,289,572 B2
(45) Date of Patent: May 14, 2019

(54) INDUSTRIAL CONTROL ADJACENT INPUT-OUTPUT MODULES AND METHODS THEREOF

(71) Applicant: General Electric Company, Schenectady, NY (US)

(72) Inventor: Fred Henry Boettner, Salem, VA (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 15/293,984

(22) Filed: Oct. 14, 2016

(65) Prior Publication Data

US 2018/0107610 A1 Apr. 19, 2018

(51) Int. Cl.
  *G06F 13/10* (2006.01)
  *G06F 13/20* (2006.01)
  *G06F 13/40* (2006.01)

(52) U.S. Cl.
  CPC .......... *G06F 13/107* (2013.01); *G06F 13/20* (2013.01); *G06F 13/4068* (2013.01); *Y02D 10/14* (2018.01); *Y02D 10/151* (2018.01)

(58) Field of Classification Search
  None
  See application file for complete search history.

(56) References Cited

U.S. PATENT DOCUMENTS

| | | | |
|---|---|---|---|
| 4,074,352 A | | 2/1978 | Cook et al. |
| 4,106,092 A | | 8/1978 | Millers et al. |
| 5,472,347 A | * | 12/1995 | Nordenstrom ....... G05B 19/054 439/61 |
| 5,696,949 A | * | 12/1997 | Young ...................... G06F 1/10 709/248 |
| 5,835,784 A | * | 11/1998 | Gillespie ................. G06F 1/10 710/10 |
| 6,662,247 B1 | * | 12/2003 | Ales ..................... G05B 19/054 710/21 |
| 6,662,254 B1 | * | 12/2003 | Tal ...................... G06F 13/4045 710/2 |
| 7,581,053 B2 | * | 8/2009 | Sichner ................. G06F 13/409 455/557 |
| 2002/0178314 A1 | * | 11/2002 | Cho ...................... G06F 13/409 710/300 |

* cited by examiner

*Primary Examiner* — Elias Mamo
(74) *Attorney, Agent, or Firm* — Armstrong Teasdale LLP

(57) ABSTRACT

Exemplified methods and systems are disclosed that provide a control IO device comprising a head unit and a plurality of IO slices coupled to a common backplane in which two or more adjacent IO slices are functionally connected to one another over an independent IO bus to form a functional IO slice group.

19 Claims, 10 Drawing Sheets

INDUSTRIAL CONTROL ADJACENT INPUT-OUTPUT MODULES AND METHODS THEREOF

TECHNICAL FIELD

The disclosure generally relates to I/O systems in automation controls.

BACKGROUND

Embedded control systems ("control systems") are used in a wide variety of different field applications. For example, control systems can be used to control and monitor power stations, turbines, motors, and the like.

One type of distributed control systems includes, at a local unit, a modular head unit that communicates to a global controller and that establishes a local data bus (also referred to as a head unit bus) that supports variable number of modular IO modules (also referred to as IO slice). The local data bus provides control signaling between the head unit and each given IO module.

For a given size of IO slice, slice entitlement defines finite resource capabilities (e.g., number of I/O field wire connection points, locations for indicator lights, power dissipation capability, among others) for the IO slice. While having varying slice sizes in a given control system can provide different entitlements, these different sized IO slices can limit or restrict the layout of the control system in a given control cabinet.

In addition, large IO slices configured with complex functions include additional IOs and capabilities not necessary for all applications.

What are needed are devices, systems, and methods that can address such limitations, among others.

SUMMARY

Exemplified methods and systems are disclosed that provide a control IO device comprising a head unit and a plurality of IO slices (also referred to herein as "modular IO terminal blocks") coupled to a common backplane in which two or more adjacent IO slices are functionally connected to one another over an independent IO bus to form a functional IO slice group (also referred to herein as a "collective IO module", and a "slice IO system"). The functional IO slice group, in some embodiments, is formed of modular IO functions in which a single slice provides the system level connection for a group of slices acting as a customizable and re-configurable subsystem. This single slice serves as a master for other slices in the functional IO slice group to aggregate and/or coordinate the operation of the individual slices in the group of slices to mimic functions and interfaces of larger, more-complex, and specialized IO slices. Put another way, the methods and systems expand entitlement associated with a given IO slice by grouping multiple slices into subsystems that, working together, provide more advanced IO and control functionality.

In addition, the exemplified methods and systems provide an IO backplane bus that optimizes the communication of the IO slice group (e.g., to provide higher performance operation) that does not affect bandwidth between slices of the functional IO slice group and the head unit and that provides higher performance (e.g., higher data rate and/or lower latency) operation suitable for certain control applications. In some embodiments, the IO backplane bus is used to augment or supplement an IO slice with functions and capabilities of a second IO slice in which control signaling between the two or more slices are performed over the dedicated IO backplane bus.

In addition, architecting with a subsystem of slices that includes local communications via the IO backplane bus facilitates a product (e.g. a functional IO group formed of multiple modular IO blocks) with high internal data rates and variable hardware able to match up with control application needs.

In an aspect, an apparatus (e.g., an IO slice) is disclosed comprising a modular IO terminal block that comprises a housing (e.g., modular housing) having one or more input or output terminals, the one or more input or output terminals being configured to provide IO for control of one or more industrial controllers, the housing having a backplane component configured to releasably couple to a second backplane component located in a second modular IO terminal block of the plurality of modular IO terminal blocks, to form a first backplane bus (e.g., a head unit bus) that electrically connects the apparatus with one or more head units (e.g., modular head units) and a plurality of modular IO terminal blocks so as to provide communication therewith, each of the plurality of modular IO terminal blocks providing IOs for industrial controls. The apparatus further includes one or more second connectors to releasably couple to an second backplane bus (e.g., IO backplane bus for a given collective IO module) to electrically connect with the second modular IO terminal block so as to communicate therewith, wherein the apparatus and the second modular IO terminal block, collectively, form a collective IO module configured to a provide an interface to an industrial controller, wherein the second backplane bus communicatively spans among two or more of the plurality of modular IO terminal blocks and not with the head unit.

In some embodiments, the apparatus includes a processor; and a memory having instruction stored thereon, wherein the instructions (e.g., to configure the collective IO module via a single command sent to a master IO module), when executed by the processor, cause the processor to: receive a first command (e.g., associated with configuration of IO ports of the collective IO module or controls of the collective IO module) via the first backplane bus, the first command being associated with the collective IO terminal; and in response to the receipt of the first command, transmit a second command (e.g., associated with configuration of IO terminal of the second modular IO terminal block or controls of the collective IO module) to the second modular IO terminal block via the second IO bus.

In some embodiments, the apparatus includes a processor; and a memory having instruction stored thereon, wherein the instructions (e.g., to configure the collective IO module via a single command sent to a master IO module), when executed by the processor, cause the processor to: receive a first command (e.g., associated with configuration of IO ports of the collective IO module) via the first backplane bus, the first command being associated with configuration of the modular IO terminal block as the collective IO terminal, collectively formed the second modular IO terminal block and a third modular IO terminal block of the plurality of modular IO blocks, wherein each of the second modular IO terminal block and the third modular IO terminal block receives a respective second and third command associated with configuration of the modular IO terminal block; and in response to the receipt of the first command, transmit one or more second commands (e.g., associated with configuration of the second IO terminal and of the third IO terminal) to the second modular IO terminal block and the third modular IO terminal block via the second IO bus.

In some embodiments, the apparatus includes a processor; and a memory having instruction stored thereon, wherein the instructions, when executed by the processor, cause the processor to: receive IO data, via the second IO bus, from the second modular IO terminal block; and process the IO data (e.g., to close a servo loop, to condition vibration inputs, to provide a safety function (e.g., vibration or acoustic), to calculate harmonic content of signals, other local control functions, or other pre-processing control functions) and transmit control data, via the second backplane bus, to the second modular IO terminal block.

In some embodiments, the apparatus includes a processor; and a memory having instruction stored thereon, wherein the instructions, when executed by the processor, cause the processor to: receive IO data, via the second IO bus, from the second modular IO terminal block; and process the IO data (e.g., to close a servo loop, to condition vibration inputs, to provide a safety function (e.g., vibration or acoustic), to calculate harmonic content of signals, other local control functions, or other pre-processing control functions) and output a control signal via the input or output terminals.

In some embodiments, the apparatus includes a processor; and a memory having instruction stored thereon, wherein the instructions, when executed by the processor, cause the processor to: receive IO data, via the second IO bus, from the second modular IO terminal block; and process the IO data (e.g., to close a servo loop, to condition vibration inputs, to provide a safety function (e.g., vibration or acoustic), to calculate harmonic content of signals, other local control functions, or other pre-processing control functions) and output a feedback signal via the first backplane bus to the head unit.

In some embodiments, the housing comprises an IO backplane component (e.g., connectors or connector assembly) configured to releasably couple to a second IO backplane component located in the second modular IO terminal block, wherein the IO backplane component and the second IO backplane component, collectively form, in whole, or in part, the second backplane bus.

In some embodiments, the second backplane bus is located in a bus housing, the bus housing having one or more connectors to couple to an external face (e.g., front face, top face, or bottom face) of the apparatus and the second modular IO terminal block.

In some embodiments, the second backplane bus is formed of a first connector and a second connector each located on a respective side of the housing of the apparatus.

In some embodiments, the first backplane bus is selected from the group consisting of a fieldbus, a VME bus, a PCI bus, a PCI-express bus, PCIX-express bus, a PC-104 bus, an ISA bus, an Ethercat bus, a RS-485 bus, a CAN (controller area network) bus, a Genius bus, and a ControlNet bus, and wherein second IO bus is selected from the group consisting of the fieldbus, the VME bus, the PCI bus, the PCI-express bus, the PCIX-express bus, the PC-104 bus, the ISA bus, the Ethercat bus, the RS-485 bus, the CAN (controller area network) bus, the Genius bus, and the ControlNet bus. Other buses or connectivity similar to those listed may be used in other embodiments.

In some embodiments, the collective IO module comprises a third modular IO terminal block.

In some embodiments, the IO interface to the industrial controller is associated with an interface selected from the group consisting of: a position regulator with a single position feedback; a pulse rate regulator with a single pulse rate feedback; a pilot cylinder regulator with two position feedbacks; a pulse rate regulator with two feedbacks; a position regulator configured to median select from three inputs; a position regulator configured to select from two ratio-metric pairs; and a pilot cylinder regulator with four position feedbacks.

In some embodiments, the first backplane bus has a first data rate and the second backplane bus has as second data rate, the second data rate being different than the first data rate. In some embodiments, the second data rate is higher (e.g., having a higher clock rate) than the first data rate. In other embodiments, the first data rate is higher (e.g., having a higher clock rate) than the second data rate.

In another aspect, a system is disclosed. The system includes one or more head units (e.g., modular head units); and two or more IO slice modules, including a first IO slice module, a second IO slice module, and a third IO slice module, that collectively form a slice IO system. The first IO slice module includes a first modular IO terminal block that includes a first set of one or more input or output terminals to provide IO for control of two or more industrial controllers, the first modular IO terminal block comprising a first housing having a first backplane component configured to releasably couple to i) a second backplane component, located in a second modular IO terminal block of the second IO slice module and ii) a third backplane component, located in a third modular IO terminal block of the third IO slice module, to form, in whole, or in part, a first backplane bus (e.g., a head unit bus or common backplane bus) that electrically connects the first IO slice module with the one or more head units. The second IO slice module includes the second modular IO terminal block that includes a second set of one or more input or output terminals to provide IO for control of the two or more industrial controllers, the second modular IO terminal block comprising a second housing having the second backplane component to couple to the first backplane component to form the first backplane bus. The third IO slice module includes the third modular IO terminal block that includes a third set of one or more input or output terminals to provide IO for control of the two or more industrial controllers, the third modular IO terminal block comprising a third housing having the third backplane component to couple to the first backplane component to form the first backplane bus. The system further includes a second backplane bus (e.g., IO backplane bus) that communicatively spans among the first, second, and third modular IO terminal blocks and not with the head unit, wherein the first modular IO terminal block is configured to: receive, via the second backplane bus, IO data from second and third modular IO terminal blocks; and transmit, via the second backplane bus, control data to the second and/or third modular IO terminal blocks or transmit status data, via the first backplane bus, to the head units.

In some embodiments, the first modular IO terminal block comprises: a processor; and a memory having instructions stored thereon, where in the instructions, when executed by the processor, cause the processor to: receive a first command via the first backplane bus, the first command being associated with configuration of the first modular IO terminal block as a part of the collective IO module; and in response to the receipt of the first command, transmit a second command to the second and the third modular IO terminal block via the second backplane bus.

In some embodiments, the first backplane bus has a first data rate and the second backplane bus has as second data rate, the second data rate being different than the first data rate. In some embodiments, the second data rate is higher (e.g., having a higher clock rate) than the first data rate. In other embodiments, the first data rate is higher (e.g., having a higher clock rate) than the second data rate.

In some embodiments, the second backplane bus is located in a bus housing, the bus housing having one or more connectors to couple to an external face (e.g., front face, top face, or bottom face) of the first modular IO terminal block, the second modular IO terminal block, and the third modular IO terminal block.

In some embodiments, the second backplane bus is formed of a first connector and a second connector each located on a respective side of the housing of the apparatus.

In some embodiments, the first backplane bus is selected from the group consisting of a fieldbus, a VME bus, a PCI bus, a PCI-express bus, PCIX-express bus, a PC-104 bus, an ISA bus, an Ethercat bus, a RS-485 bus, a CAN (controller area network) bus, a Genius bus, and a ControlNet bus, and wherein the IO backplane bus is selected from the group consisting of the fieldbus, the VME bus, the PCI bus, the PCI-express bus, the PCIX-express bus, the PC-104 bus, the ISA bus, the Ethercat bus, the RS-485 bus, the CAN (controller area network) bus, the Genius bus, and the ControlNet bus.

In another aspect, a method is disclosed of operating an industrial controller. The industrial controller has a first backplane bus between a head unit and a plurality of a modular IO terminal blocks. The method includes: receiving, from a head unit, at a first modular IO terminal block, via the first backplane bus, a first command associated with configuration of a portion of the plurality of modular IO terminal blocks as a collective IO terminal, wherein the collective IO terminal is collectively formed of the first modular IO terminal block, a second modular IO terminal block, and a third modular IO terminal block.

The method further includes, in response to the first command, establishing, at the first modular IO terminal block, a connection with each of the second modular IO terminal block and the third modular IO terminal block over an IO backplane bus, wherein subsequent run-time control-loop among the first modular IO terminal block, the second modular IO terminal block, and the third modular IO terminal, as the collective IO module is conducted over the IO backplane bus.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4, comprising

DETAILED SPECIFICATION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Example IO Control System

Figure 1:
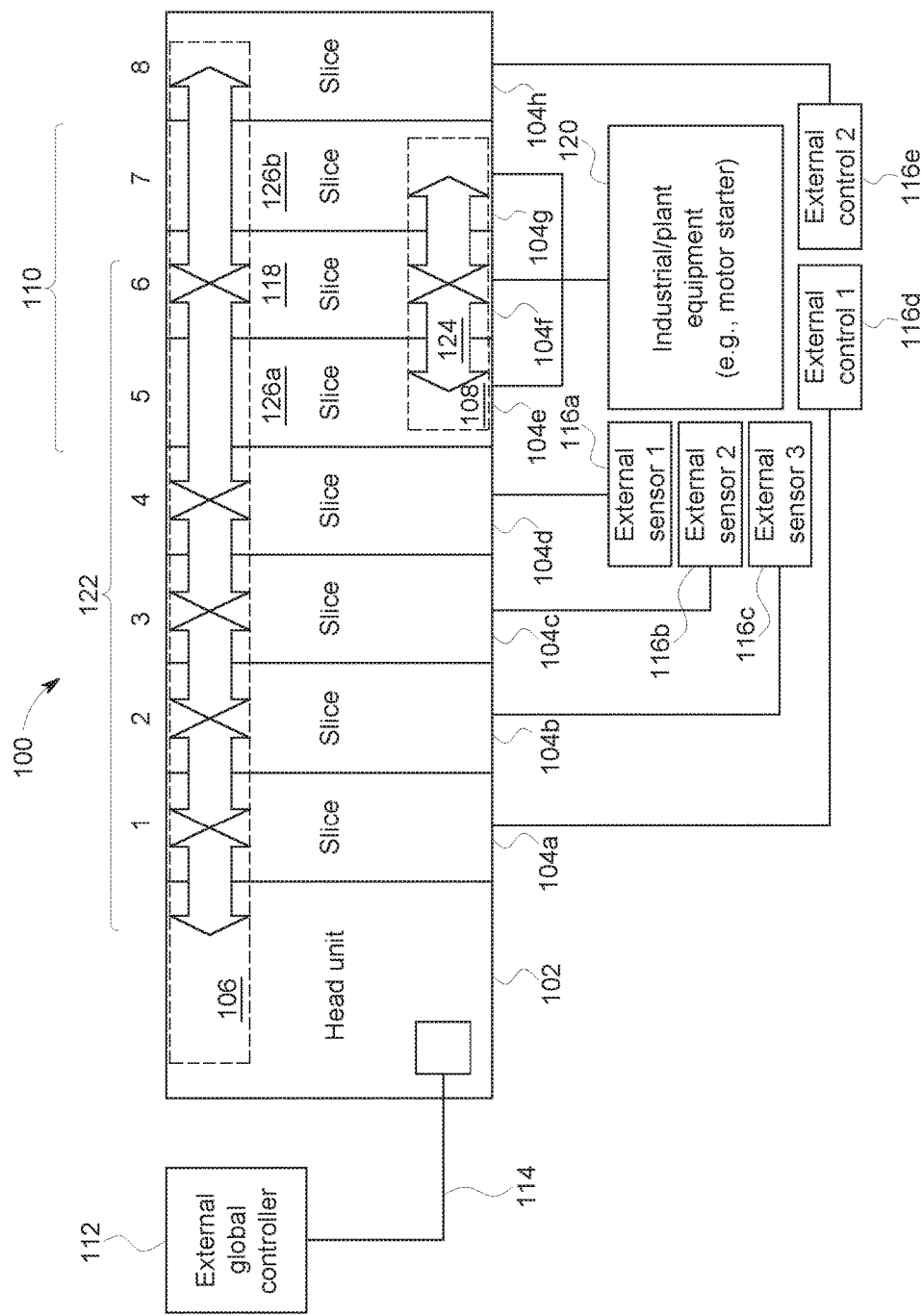
FIG. 1 illustrates a control IO device comprising a head unit and a plurality of modular IO terminal blocks that are collectively coupled to form the control IO device with a common backplane bus and an IO backplane bus that forms a functional IO slice group, from individual modular IO terminal blocks, in accordance with an illustrative embodiment.

FIG. 1 illustrates a control IO device 100 comprising a head unit 102 and a plurality of modular IO terminal blocks 104 (shown as "Slice" 104a-104h) that are collectively coupled to form the control IO device with i) a common backplane bus 106 (also referred to as a 'head unit bus" 106) and ii) an IO backplane bus 108 that forms a functional IO slice group 110 (also referred to as "a slice I/O subsystem"), from individual modular IO terminal blocks, in accordance with an illustrative embodiment.

The control IO device 100, in some embodiments, is part of a distributed control system. The head unit 102 communicates to a global controller 112 over one or more cables or wirings (114) via one or more communication protocols such as IONET (Internet Protocol Operational Network), Profinet, Foundation Fieldbus (e.g., Foundation Fieldbus H1), Ethercat, and other Ethernet-based fieldbus protocol, for example, based on 100 Mbps Ethernet signaling. As shown in FIG. 1, the head unit 102 communicates to the modular IO terminal blocks 104a-104h over the backplane bus 106 to interface to one or more field devices 116 (shown as "External Sensor 1" 116a, "External Sensor 2" 116b, "External Sensor 3" 116c, "External Control 1" 116d, and "External Control 2" 116e).

The head unit 102, in some embodiments, is configured to generate various power levels for the control IO device. In other embodiments, the various power levels used by the control IO device is provided externally to the head unit 102.

Field devices can include, but not limited to, devices that measure and/or control the flow of air, steam, water, and gas. Examples of field devices include, but are not limited to, contact switch devices, temperature sensors or regulator devices, current and/or voltage sensors or regulator devices, fluid sensing sensors or regulator devices, air velocity sensors or regulator devices, inverter drives, pressure sensors or regulator devices, relay devices, panel products, signal converters, valves control, actuators, motors, drives, network connectivity, among others.

Referring still to FIG. 1, the head unit 102 communicates, over the IO backplane bus 106, to the functional IO slice group 110 that is formed, as a non-limiting example, of modular IO terminal blocks 104e, 104f, and 104g. The functional IO slice group 110 includes a master modular IO terminal block 118 and one or more adjacent modular IO terminal blocks 126 (shown as 126a, 126b) (also referred to herein as slave modular IO terminal blocks), which are releasably coupled to one another (e.g., 118, 126a, and 126b) to form a field device, within the control IO device 100, to control or to regulate a controllable industrial equipment 120. That is, when grouped together, e.g., via operation over the IO backplane bus 108, the modular IO terminal blocks (e.g., 104e, 104f, and 104g) form the functional IO slice group 110 that can control or to regulate a controllable industrial equipment 120 in which the IO backplane bus 108 provides a dedicated bus among the master modular IO terminal block 118 and adjacent modular IO terminal blocks 126 in the functional IO slice group 110.

Example of a controllable industrial equipment 120 includes, but are not limited to, position regulator, a pulse rate regulator, a pilot cylinder regulator, a vibration or acoustic protection subsystem, a servo-loop regulator, an input conditioning subsystem, an inverter, among others.

Adjacent modular IO terminal blocks as used herein refer to modular IO terminal block that are located nearby or in proximity to the master modular IO terminal block 118 and that forms a functional IO group with the master modular IO terminal block 118. Adjacent modular IO terminal blocks 126 do not have to be in contact with, or located next to, the master modular IO terminal block 118.

It should be appreciated that a functional IO slice group 110 can be used as a control interface to one or more field devices 116, and individual data from individual modular IO terminal blocks in the functional IO slice group 110 are aggregated by one or more modular IO terminal blocks in the functional IO slice group 110. The aggregated data can be transmitted to the head unit 102 over the common backplane bus 106.

Though shown in FIG. 1 with 8 modular IO terminal blocks 104, it should be appreciated that the control IO device 100 is scalable to operate with varying numbers of modular IO terminal blocks 104 over the backplane bus 106. In some embodiments, the head unit 102 is configured to operate with up to about 16 modular IO terminal blocks 104 (e.g., 15 or 16 blocks). In some embodiments, the head unit 102 is configured to operate with up to about 64 modular IO terminal blocks 104 (e.g., 63 or 64 blocks). In some embodiments, the head unit 102 is configured to operate with up to about 128 modular IO terminal blocks 104 (e.g., 127 or 128 blocks). In some embodiments, the head unit 102 is configured to operate with up to about 512 modular IO terminal blocks 104 (e.g., 511 or 512 blocks).

Within a functional IO slice group 110, a modular IO control block is designated as a master 118 (also referred to as a master IO slice 118). In a non-limiting example shown in FIG. 1, the head unit 102 communicates with a master modular IO terminal block 118 over the common backplane 106 via a first data flow 122. The master modular IO terminal block 118 aggregates data from, and provide controls to, the two or more adjacent IO slices 126 over the independent IO backplane bus 108 in a second set of data flow 124.

As shown in FIG. 1, when shared data is transmitted to two or more adjacent slices from the head unit, the shared data is transmitted through a single data path 122 over the common backplane bus 106. In some embodiments, the data flow 122 is controlled by the head unit 102. In other embodiments, the data flow 122 is controlled by peer-peer communication via individual modular IO terminal blocks 104. In other embodiments, the data flow 122 is controlled by both the head unit 102 and by modular IO terminal blocks 104.

As shown in FIG. 1, when data is transmitted between the master modular IO terminal block 118 and the two or more adjacent IO slices 126a and 126b, the data is transmitted through a second independent data path 124 so as not to interfere with head-unit-to-slice data movement (e.g., 122). In some embodiments, the data flow 124 is controlled by the master IO slice 118. In other embodiments, the data flow 124 is controlled by peer-peer communication via individual modular IO terminal blocks 104. In addition to mitigating the likelihood of interference, the second independent data path 124 over the IO backplane bus 108 does not require or expend processing resources of the head unit 102 because the head unit 102 does not need to be beware of the data path 124 during runtime, e.g., to maintain, track, and/or control data flow over the IO backplane bus 108. In addition, the data rate of the IO backplane bus 108 can be configured to be different (e.g., operating on a higher clock speed or a lower clock speed) from the backplane bus 106, e.g., to facilitate higher performance or for improved energy efficiency.

The master modular IO terminal block 118 includes, in some embodiments, a microcontroller, a bus controller to manage connection with the head-unit, local I/O channels as permitted by slice entitlement, and a second bus controller to manage connections with adjacent modular IO terminal blocks (e.g., 126a, 126b). The adjacent modular IO terminal blocks 126, in some embodiments, include IO channels that differ from the IO channels of the master modular IO terminal block 118. In other embodiments, one or more of the adjacent modular IO terminal blocks 126 include IO channels similar, or identical, to those of the master modular IO terminal block 118.

During runtime operation, the master modular IO terminal block 118 obtains, in some embodiments, signals from the adjacent modular IO terminal blocks 126, calculates and/or processes the obtained signals to provide values to present to the head unit 102 and/or to determine local actions (e.g., control actions), on-board (e.g., at the master slice), and/or with another adjacent modular IO terminal blocks 126. The adjacent modular IO terminal blocks 126 acquire input signals and transmit the acquired input signals on the IO backplane bus in a local communication path. The adjacent modular IO terminal blocks 126 also acquires output parameters, e.g., generated by the master modular IO terminal block 118, from the same local connection path and outputs the acquired output parameters to corresponding output terminals. In some embodiments, a single master modular IO terminal block 118 is configurable to provide processing resources for a number of adjacent IO terminal blocks 126 to, collectively, provide a complex control function.

Example Functional IO Slice Group

Table 1, comprising Tables 1A, 1B, 1C, 1D, and 1E, each illustrates, as a non-limiting example, operations of modular IO blocks in an example functional IO slice group to interface to an industrial/plant equipment. It is contemplated that the number of modular IO terminal blocks (i.e., sub-system slices) for a given aggregated IO function within a functional IO slice group can vary based on the existing slice entitlement of the modular IO blocks.

TABLE 1A

| Type | Description | Single input slice | | Mstr10/2 in | |
|---|---|---|---|---|---|
| no_fdk | Regx_Ref is directly the Servo mA command. Regn_fdbk is not used and set to 0. This regulator type may be used when the actual servo position regulator is performed in application logic. | Master | 10 mA | Master/10 | |

Table 1A shows an example functional IO slice group that provides servo control without a feedback loop, e.g., for use in certain servo position regulator, and implemented by two example types of modular IO blocks having different slice entitlements. In a first embodiment (shown as "Single input slice"), two slices are shown to operate in a functional IO group in which the first slice serves as the master (e.g., for processing, shown as "Master") and the second slice provides output IO (shown as "10 mA"). In a second embodiment (shown as "Mster10/2 in), a single slice is shown to include the processing resource and the output IO (namely, a 10 mA output) to do the same.

TABLE 1B

| Type | Description | Single input slice | | 2x input slice | | Mstr10/2 in | |
|---|---|---|---|---|---|---|---|
| 1_LV | Position regulator used with a single LVDT input. | Master | 10 mA LVDT | Master | 10 mA 2x LVDT | Master/10 | 2x LVDT |
| 1_PulseRate | Pulse rate regulator used with a single pulse rate feedback. | Master | 10 mA Pulse | Master | 10 mA 2x Pulse | Master/10 | 2x Pulse |

Table 1B shows an example functional IO slice group that provides a single input feedback control, e.g., for use in certain position regulators or pulse rate regulators, and implemented by three example types of modular IO blocks having different slice entitlements. In a first embodiment (shown as "Single input slice"), three slices are shown to operate in a functional IO slice group in which the first slice serves as the master (e.g., for processing, shown as "Master"), the second slice provides output IO (shown as "10 mA"), and the third slice provides input IO (shown as "LVDT" or "Pulse"). In a second embodiment (shown as "2x input slice"), three slices are shown to operate in the functional IO slice group in which the first slice serves as the master (e.g., for processing, shown as "Master"), the second slice also provides output IO (shown as "10 mA"), and the third slice also provides input IO (shown as "2×LVDT" or "2× Pulse"). In a third embodiment (shown as "Mstr10/2 in"), two slices are shown to operate in the functional IO slice group in which the first slice serves as the master (e.g., for processing, shown as "Master") and provides output IO (shown as "10 mA"), and the second slice provides two input IOs (shown as "2×LVDT" or "2× Pulse").

TABLE 1C

| Type | Description | | Single input slice | | | | 2x input slice | | Mstr10/2 in | |
|---|---|---|---|---|---|---|---|---|---|---|
| 2_LVpilotCyl | Pilot Cylinder regulator with two LVDT position feedbacks: LVDT1 (main) and LVDT2 (pilot). | Master | 10 mA | LVDT | LVDT | Master | 10 mA 2x LVDT | Master/10 | 2x LVDT |
| 2_LVposMAX | Position regulator using the maximum select from 2 LVDT inputs for feedback. | Master | 10 mA | LVDT | LVDT | Master | 10 mA 2x LVDT | Master/10 | 2x LVDT |
| 2_LVposMIN | Position Regulator using the minimum select from 2 LVDT inputs for feedback. | Master | 10 mA | LVDT | LVDT | Master | 10 mA 2x LVDT | Master/10 | 2x LVDT |
| 2_PlsRateMAX | 2_PlsRateMAX Pulse Rate Regulator using the maximum select from two pulse rate feedbacks. | Master | 10 mA | Pulse | Pulse | Master | 10 mA 2x Pulse | Master/10 | 2x Pulse |

Table 1C shows an example functional IO slice group that provides two feedback controls, e.g., for use in certain pilot cylinder regulators, position regulators, and pulse rate regulators, and implemented by three example types of modular IO blocks having different slice entitlements. In a first embodiment (shown as "Single input slice"), four slices are shown to operate in a functional IO slice group in which the first slice serves as the master (e.g., for processing, shown as "Master"), the second slice provides output IO (shown as "10 mA"), and the third and fourth slices each provides input IO (shown as "LVDT" or "Pulse"). In a second embodiment (shown as "2× input slice"), three slices are shown to operate in the functional IO slice group in which the first slice serves as the master (e.g., for processing, shown as "Master"), the second slice provides output IO (shown as "10 mA"), and the third slice provides two input IOs (shown as "2×LVDT" or "2× Pulse"). In a third embodiment (shown as "Mstr10/2 in"), two slices are shown to operate in the functional IO slice group in which the first slice serves as the master (e.g., for processing, shown as "Master") and to provide output IO (shown as "10 mA"), and the second slice provides two input IOs (shown as "2×LVDT" or "2× Pulse").

TABLE 1D

| Type | Description | | Single input slice | | | |
|---|---|---|---|---|---|---|
| 3_LV_LMX | Position Regulator using the median select from 3 LVDT inputs for feedback. Originally designed for the LMX100 gas turbine. | Master | 10 mA | LVDT | LVDT | LVDT |
| 3_LVposMID | Position Regulator using the median select from 3 LVDT inputs for feedback. Originally designed for heavy-duty gas turbines | Master | 10 mA | LVDT | LVDT | LVDT |

| Type | 2x input slice | | | | Mstr10/2 in | | |
|---|---|---|---|---|---|---|---|
| 3_LV_LMX | Master | 10 mA | 2x LVDT | LVDT | Master/10 | 2x LVDT | LVDT |
| 3_LVposMID | Master | 10 mA | 2x LVDT | LVDT | Master/10 | 2x LVDT | LVDT |

Table 1D shows an example functional IO slice group that provides three input feedback controls, e.g., for use in certain position regulators, and implemented by three example types of modular IO blocks having different slice entitlements. In a first embodiment (shown as "Single input slice"), five slices are shown to operate in a functional IO slice group in which the first slice serves as the master (e.g., for processing, shown as "Master"), the second slice provides output IO (shown as "10 mA"), and the third, fourth, and fifth slices each provides input IO (shown as "LVDT"). In a second embodiment (shown as "2× input slice"), four slices are shown to operate in the functional IO slice group in which the first slice serves as the master (e.g., for processing, shown as "Master"), the second slice provides output IO (shown as "10 mA"), the third slice provides two input IOs (shown as "2×LVDT"), and the fourth slice provide a single input IO (shown as "LVDT"). In a third embodiment (shown as "Mstr10/2 in"), three slices are shown to operate in the functional IO slice group in which the first slice serves as the master (e.g., for processing, shown as "Master") and to provide output IO (shown as "10 mA"), the second slice provides two input IOs (shown as "2×LVDT"), and the third slice provides a single input IO (shown as "LVDT").

TABLE 1E

| Type | Description | Single input slice | | | | | |
|---|---|---|---|---|---|---|---|
| 4_LV_LM | Position Regulator selecting one of two ratio-metric LVDT pairs for the position feedback. Originally designed for the LM1600, LM2500, and LM6000 gas turbines. | Master | 10 mA | LVDT | LVDT | LVDT | LVDT |
| 4_LV_LMX | Position Regulator selecting from 2 LVDT ratio-metric pairs for feedback. | Master | 10 mA | LVDT | LVDT | LVDT | LVDT |
| 4_LVp/cylMAX | Pilot Cylinder Regulator with four LVDT position feedbacks: LVDT1 (main), LVDT2 (main), LVDT3 (pilot), and LVDT4 (pilot). | Master | 10 mA | LVDT | LVDT | LVDT | LVDT |

| Type | 2x input slice | | | | Mstr10/2 in | | |
|---|---|---|---|---|---|---|---|
| 4_LV_LM | Master | 10 mA | 2x LVDT | 2x LVDT | Master/10 | 2x LVDT | 2x LVDT |
| 4_LV_LMX | Master | 10 mA | 2x LVDT | 2x LVDT | Master/10 | 2x LVDT | 2x LVDT |
| 4_LVp/cylMAX | Master | 10 mA | 2x LVDT | 2x LVDT | Master/10 | 2x LVDT | 2x LVDT |

Table 1E shows an example functional IO slice group that provides four input feedback controls, e.g., for use in certain position regulators and pilot cylinder regulators, and implemented by three example types (as non-limiting examples) of modular IO blocks having different slice entitlements. In a first embodiment (shown as "Single input slice"), six slices are shown to operate in a functional IO slice group in which the first slice serves as the master (e.g., for processing, shown as "Master"), the second slice provides output IO (shown as "10 mA"), and the third, fourth, fifth, and sixth slices each provides input IO (shown as "LVDT"). In a second embodiment (shown as "2x input slice"), four slices are shown to operate in the functional IO slice group in which the first slice serves as the master (e.g., for processing, shown as "Master"), the second slice provides output IO (shown as "10 mA"), and the third and fourth slices each provides two input IOs (shown as "2xLVDT"). In a third embodiment (shown as "Mstr10/2 in"), three slices are shown to operate in the functional IO slice group in which the first slice serves as the master (e.g., for processing, shown as "Master") and to provide output IO (shown as "10 mA"), and the second and third slices each provides two input IOs (shown as "2xLVDT").

As demonstrated by Tables 1A, 1B, 1C, 1D, and 1E, the number of modular IO blocks that forms a given functional IO slice group may vary (e.g., be reduced) if the modular IO blocks includes more than one IO and/or more than one IO type. It is contemplated that other modular IO blocks, for example, of varying slice entitlements and/or having diverse IO and processing capabilities may be used and combined as described in a manner provided herein.

The slice subsystem architecture provides performance suitable for more complex control functions over conventional slice architecture. As a non-limiting example, in hydraulic servo controls to control the positions of valves or the positions of actuators in industrial processes, a valve position, for example, is sensed through one or more position sensors, and a measurement such as pressure or flow is used to regulate closure of a local servo control regulator loop. In such embodiment, the dataflow in the functional IO group that includes the local servo control regulator loop is transmitted over the IO backplane bus at a high data speed and with low-latency. In contrast, the data flow between the servo control and the head unit operates at a lower data rate and can include, e.g., command values to set the local regulation target for the regulator and/or feedback of regulator health. These target regulation command and health feedback (as well as monitoring and diagnostics data) may be transmitted periodically or on an event-basis.

In addition, the slice subsystem architecture, as described herein, provide flexibility and scalability over a fixed large slice. For example, in a non-limiting example, after installation of the control IO device, it is determined that position sensing as a LVDT or LVDR sensors requiring excitation output and position feedback may be further desired. Because position sensing may alternately be a pulse device (for example, with quadrature signals and a home position signal), and the process being regulated may be measured with a sensor providing voltage, current, pulse rate, or fieldbus feedback, a given manufacturer in designing a max-case servo regulator would either design the servo with a very large number of signals of different types or provide many alternative servo designs. The exemplified systems and methods facilitate use of a master slice that includes a servo coil drive and one or more subsystem slices that includes LVDT/LVDR, pulse rate, and analog signaling to provide a combination of subsystem slices needed for the specific application.

Example Modular IO Terminal Block with IO Backplane Bus Controller

Figure 2:
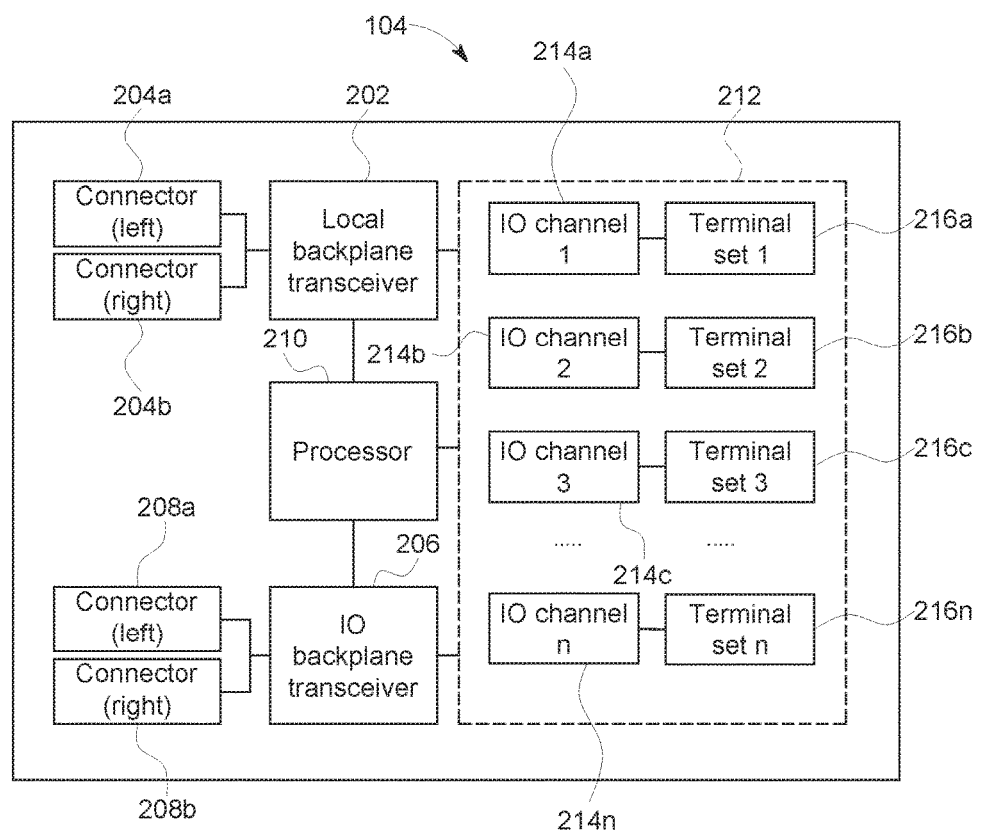
FIG. 2 illustrates an example modular IO terminal block of FIG. 1 that is releasably connectable to another modular IO terminal block to form the control IO device with a common backplane bus and to form the functional IO slice group over the IO backplane bus, in accordance with an illustrative embodiment.

FIG. 2 illustrates an example modular IO terminal block 104 of FIG. 1 that is releasably connectable to another modular IO terminal block to form the control IO device 100 with a common backplane bus 106 and to form the functional IO slice group 110 over the IO backplane bus 108, in accordance with an illustrative embodiment.

The modular IO terminal block 104 includes a first backplane transceiver 202 (shown as "Local Backplane Transceiver" 202) that is operatively coupled to connectors 204 (shown as "Connector (Left)" 204a and "Connector (Right)" 204b) that can each releasably connect with a corresponding connector on another modular IO terminal block 104 (e.g., a second modular IO terminal block), or the head unit 102, so as to form the local backplane bus 106 to communicate with the head unit 102. The modular IO terminal block 104 further includes a second backplane transceiver 204 (shown as "IO Backplane Transceiver" 204) that can also releasably connect with a corresponding connector on the second modular IO terminal block to form the IO backplane bus 108.

Each connectors 204, 208 include one or more terminals that serves as a serial data interface or a parallel data interface with the respective local or IO backplane bus.

Though shown as two connectors, the first backplane transceiver 202 and second backplane transceiver 204 can each be coupled to a single connector that serves as a connection to the IO backplane bus.

Referring to FIG. 2, as a non-limiting example, the modular IO terminal block 104 includes a processor 210 that is operatively coupled to the local backplane transceiver 202, to the IO backplane transceiver 204, and to field circuitry 212. As used herein, processor refers to a physical hardware device that executes encoded instructions for performing functions on inputs and creating outputs. The processor can be microcontrollers, microprocessors, or logic circuits such as ASICs (Application Specific Integrated Circuit), CPLDs (Complex Programmable Logic Device), FPGA (Field Programmable Gate Array), or other programmable logic integrated circuits.

The field circuitry 212 provides one or more IO channels that serves as an interface (e.g. a digital input, a digital output, an analog input, or an analog output). The field circuitry 212 may include like IO types (e.g., a set of analog input, a set of analog outputs, a set of digital inputs, a set of digital output, a communication transceiver) or a mixed of diverse IO types. As shown in FIG. 2, and as a non-limiting example, the field circuitry 212 includes a bank of IO channels 214 (shown as "IO Channel 1" 214a, "IO Channel 2" 214b, "IO Channel 3" 214c, and "IO Channel n" 214d). The IO channels 214 are coupled to IO terminal blocks 216 (shown as "Terminal Set 1" 216a, "Terminal Set 2" 216b, "Terminal Set 3" 216c, and "Terminal Set n" 216n).

Figure 3:
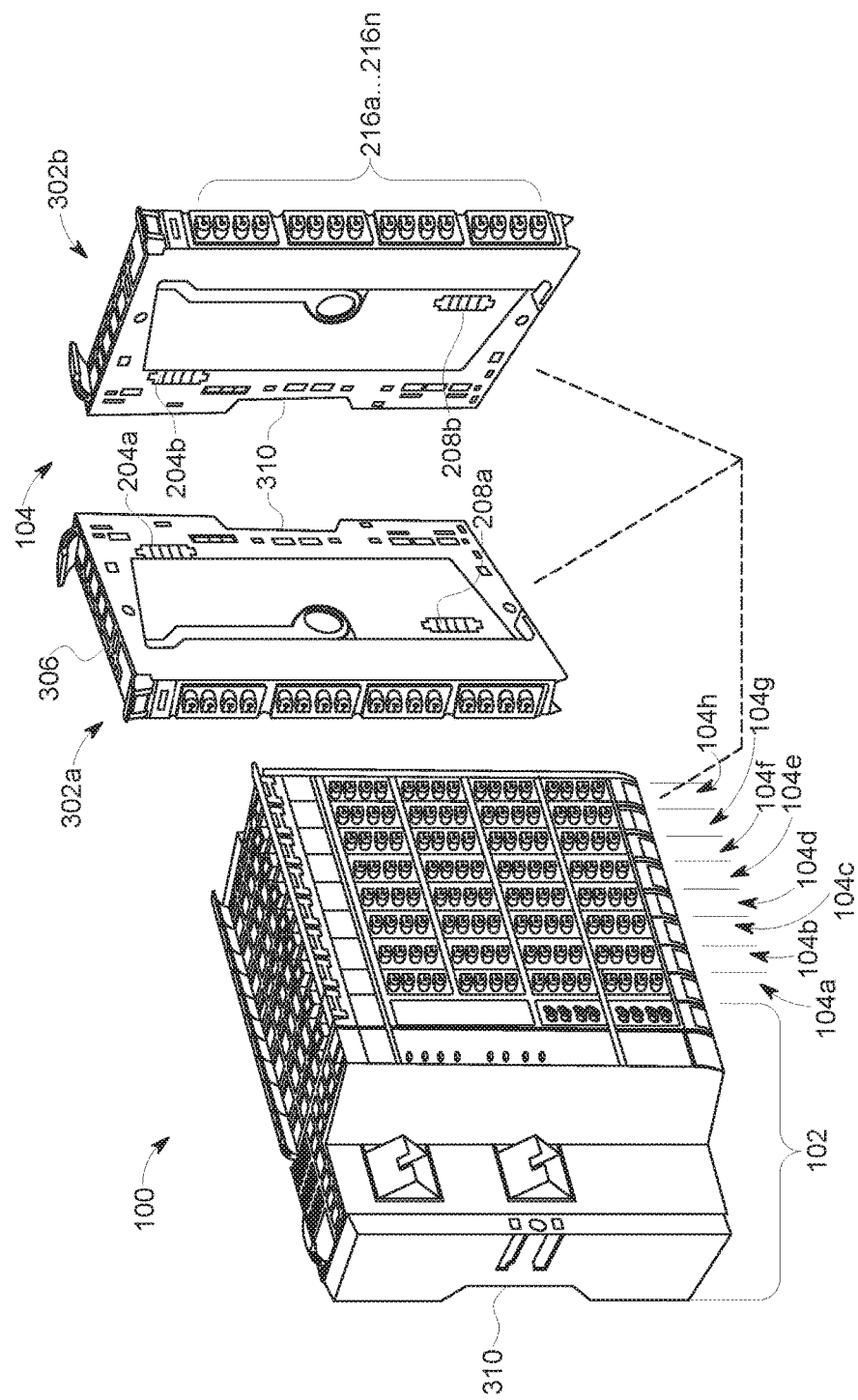
FIG. 3 illustrates an example IO control device that includes a head unit and modular IO terminal blocks configured to attach to one another to form an IO backplane bus and to form a functional IO slice group, as described in relation to FIGS. 1 and 2, in accordance with an illustrative embodiment.

FIG. 3 illustrates an example IO control device 100 that includes a head unit 102 and modular IO terminal blocks 104 configured to attach to one another (as stackable or connectable elements) to form an IO backplane bus 108 and to form a functional IO slice group 110, as described in relation to FIGS. 1 and 2, in accordance with an illustrative embodiment. FIG. 3 also illustrates an example modular IO terminal block 104. On a right side view (shown as 302a) of the modular IO terminal block 104, the connector 204a to the local backplane bus 106 is shown, and the connector 208a to the IO backplane bus 108 is also shown. On the left side view (shown as 302b), the connector 204b to the local backplane bus 106 is shown, and the connector 208b to the IO backplane bus 108 is also shown.

The connectors 204 and 208 are backplane components in a given modular IO terminal blocks 104 that facilitate releasable connection with backplane components on an adjacent modular IO terminal block. The connectors 204 and 208, in some embodiments, are flushed within a housing 306 of the modular IO terminal blocks 104, when in a non-assembled configuration, and are configured to outwardly extend from the housing 306 to contact a corresponding connector on another modular IO terminal block, when in the assembled configuration. In some embodiments, each modular IO terminal block 104 includes a mechanical coupling or a magnetic couple, or other means, that facilitates movement of the connectors to cause the extension when two modular IO terminal blocks 104 are assembled to one another. In other embodiments, the modular IO terminal blocks can be fastened to one another, e.g., via screws, or via lockable hinges, among other means.

In some embodiments, the housing 306 of the modular IO terminal blocks 104 and/or the head unit 102 includes a mountable recess 310 to receive a DIN rail connector to which the IO control device 100 can affix for mounting within a cabinet, controls panel, and etc.

Figure 4A:
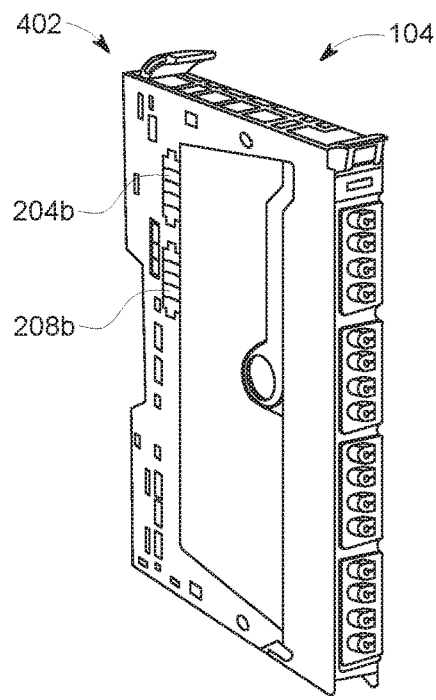
FIGS. 4A and 4B, illustrates another example modular IO terminal blocks configured to attach to one another to form an IO backplane bus and to form a functional IO slice group, as described in relation to FIGS. 1 and 2, in accordance with another illustrative embodiment.
Figure 4B:
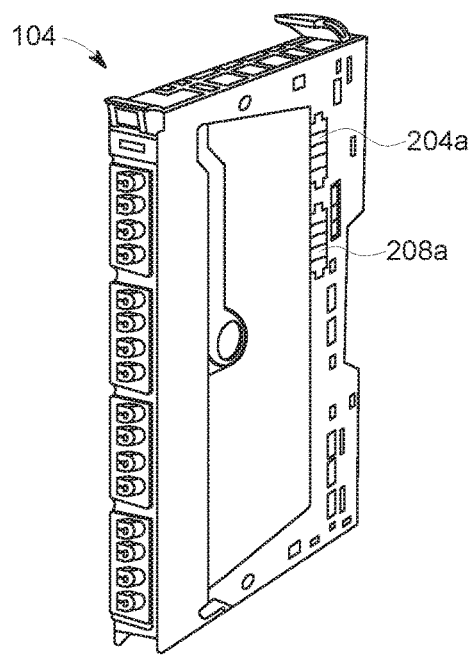

FIG. 4, comprising FIGS. 4A and 4B, illustrates another example modular IO terminal blocks 104 configured to attach to one another to form an IO backplane bus 108 and to form a functional IO slice group 110, as described in relation to FIGS. 1 and 2, in accordance with another illustrative embodiment. FIG. 4A shows a left view of the modular IO terminal block 104 with connectors 204a and 208a located proximal to one another. FIG. 4B shows a right view of the modular IO terminal block 104 with connectors 204b and 208b located at corresponding locations to connectors 204a and 208a.

Figure 5:
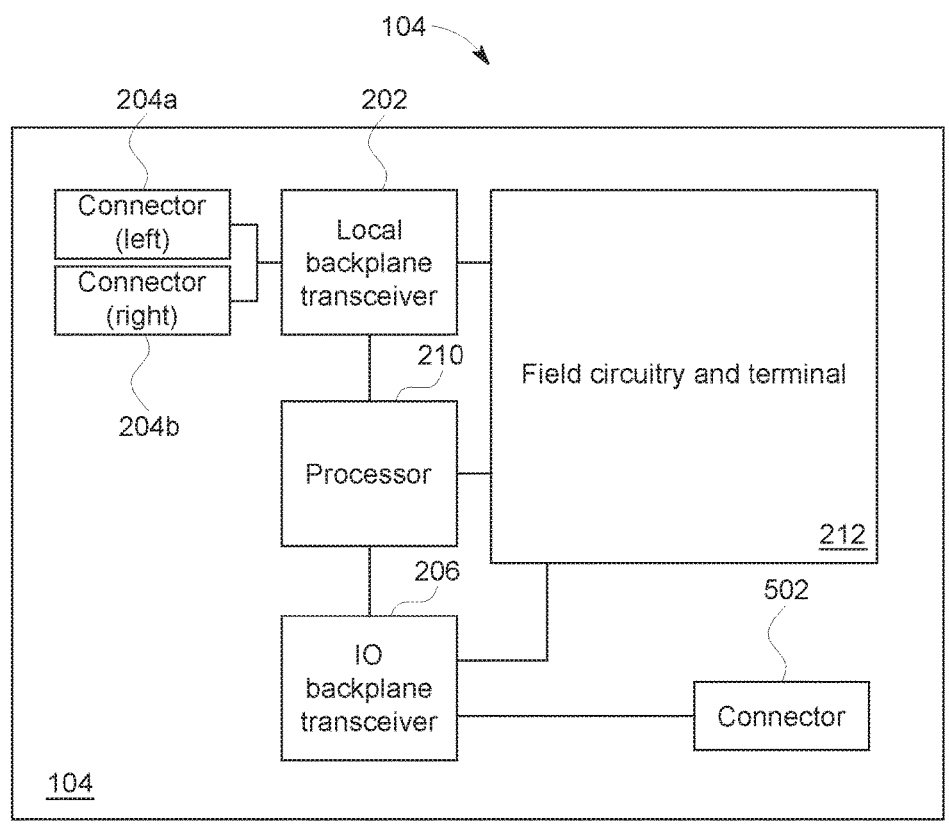
FIG. 5 illustrates another example modular IO terminal block of FIG. 1 that is releasably connectable to another modular IO terminal block to form the control IO device with a common backplane bus and to form the functional IO slice group over the IO backplane bus, in accordance with another illustrative embodiment.

FIG. 5 illustrates another example modular IO terminal block 104 of FIG. 1 that is releasably connectable to another modular IO terminal block to form the control IO device 100 with a common backplane bus 106 and to form the functional IO slice group 110 over the IO backplane bus 108, in accordance with another illustrative embodiment. As shown in FIG. 5, the IO backplane bus 108 is formed via one or more connectors 502 located at the front of the modular IO terminal block.

Figure 6:
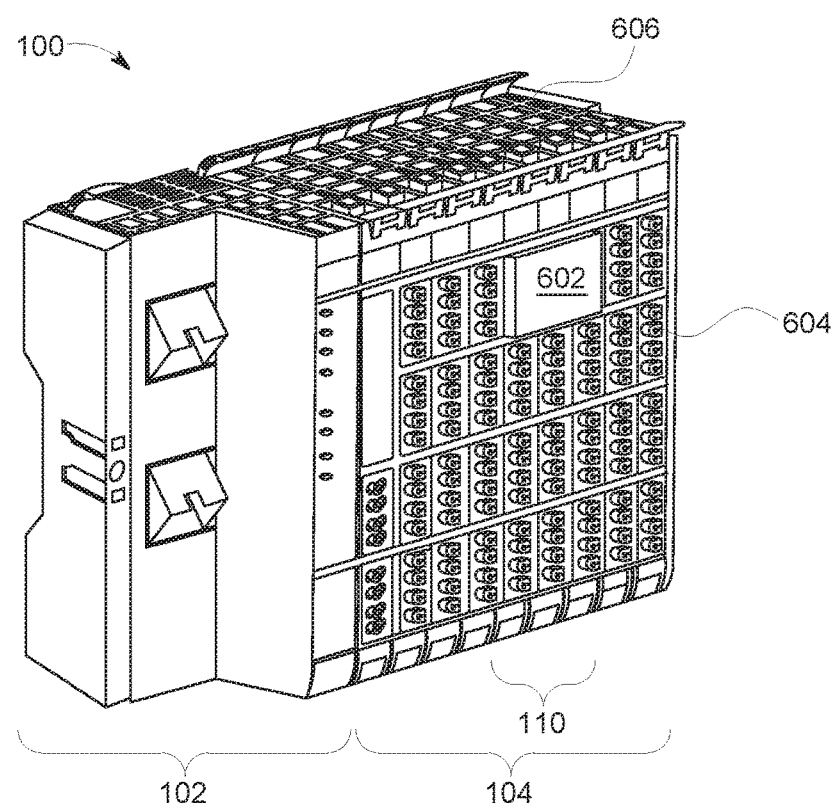
FIG. 6 illustrates an example IO control device assembled from a head unit and a modular IO terminal blocks, as described in relation to FIG. 5, in accordance with another illustrative embodiment.

FIG. 6 illustrates an example IO control device 100 assembled from a head unit 102 and a modular IO terminal blocks 104, as described in relation to FIG. 5, in accordance with another illustrative embodiment. As shown in FIG. 6, an external bus housing 602 couples to a front face 604 the IO control device 100 to span the two or more adjacent IO terminal blocks 104 when forming the functional IO slice group 110.

It is contemplated that the IO terminal blocks 104 can include connectors 208 located on a top face 606 or a bottom face 608 to provide connections to an external bus housing 602 thereat.

Example Method of Configuring a Functional IO Slice Group

Figure 7:
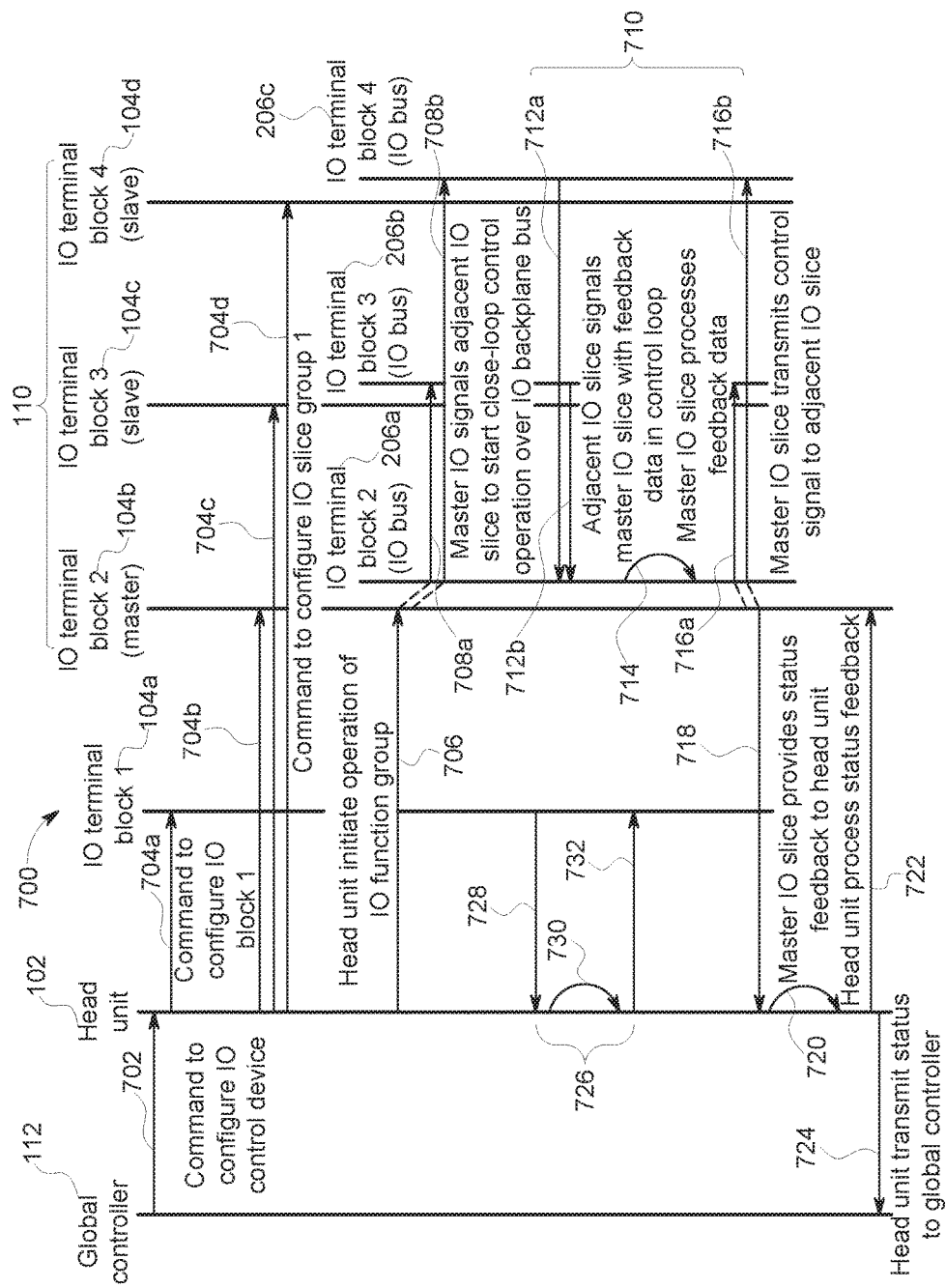
FIG. 7 is a flow diagram of an example method of operating a functional IO slice group, in accordance with an illustrative embodiment.

FIG. 7 is a flow diagram of an example method 700 of operating a functional IO slice group, in accordance with an illustrative embodiment. As shown in FIG. 7, the head unit 102 is operatively connected (e.g., via the local backplane bus 106) to modular IO terminal blocks 104 (shown as "IO Terminal Block 1" 104a, "IO Terminal Block 2" 104b, "IO Terminal Block 3" 104c, and "IO Terminal Block 4" 104d). The head unit 102 is also operatively connected (e.g., via a network) to a global controller 112. In this non-limiting example, when the IO function group 110 is established, the "IO Terminal Block 1" 104a serves as a master modular IO terminal block 118, and the "IO Terminal Block 2" 104b and "IO Terminal Block 3" 104c serve as adjacent IO terminal blocks 126, as discussed in relation to FIG. 1.

As shown in FIG. 7, upon receiving (702) a configuration command for the control IO device 100 from the global controller 112, the head unit 102 transmits (704), via the local backplane bus 106, a plurality of configuration commands 704 (shown as 704a, 704b, 704c, and 704d) to the modular IO terminal blocks 104a, 104b, 104c, and 104d. In other embodiments, the head unit 102 only transmits (704b) configuration commands to the master modular IO terminal block 118 (e.g., 104b) and, in response to the receipt (704b) of the first command, the "IO Terminal Block 2 (Master)" 104b transmits, via the local IO backplane bus 108, a second command to one or more modular IO terminal blocks (e.g., a second modular IO terminal block and a third modular IO terminal block, and etc.) to establish the functional IO slice group 110.

The configuration commands include configuration profiles for the respective IO terminal block that establishes a functional IO slice group 110. As a non-limiting example and shown in FIG. 7, the configuration commands cause "IO Terminal Block 1" 104a to configure field circuitries located therein, and the configuration commands further cause the "IO Terminal Block 2" 104b, "IO Terminal Block 3" 104c, and "IO Terminal Block 4" 104d to configure field circuitries located therein and to enable the IO backplane bus controllers (e.g., 206) associated with "IO Terminal Block 2—(IO Bus)" 206a, "IO Terminal Block 3—(IO Bus)" 206b, and "IO Terminal Block 3—(IO Bus)" 206c to communicate over the IO backplane bus 108. In some embodiments, an acknowledgement message is transmitted from each of the IO terminal blocks 104 to the head unit 102 following a successful configuration of its respective field circuitries and/or IO backplane bus controllers.

After configuration of the functional IO slice group 110, upon receipt (706) of an initialization command at the "IO Terminal Block 2 (Master)" 104b over the local backplane bus 106, the "IO Terminal Block 2 (Master)" 104b transmits (shown as 708a and 708b), over the IO backplane bus 108, an initialization command to the adjacent IO terminal blocks in the functional IO slice group 110 (e.g., to the controllers 206b and 206c over the IO backplane bus 108). The initialization command initiates a control-loop 710 that executes in the functional IO slice group 110. The initialization command may include a target-regulation command for the functional IO slice group 110. As shown in FIG. 7, the control-loop 710 that executes during runtime include the operation of the "IO Terminal Block 3 (Slave)" 104c and "IO Terminal Block 4 (Slave)" 104d transmitting (shown as 712a and 712b) feedback data over the IO backplane bus 108 to the "IO Terminal Block 2 (Master)" 104b. Examples of control-loop 710 includes, but not are limited to, PI/PID regulations, high-speed or high-priority safety and protection signals, and etc.

Referring still to FIG. 7, the "IO Terminal Block 2 (Master)" 104b, optionally acquires feedback signals from field circuitries located therein, and processes (714) the feedback signals, and transmits control signals to the output IO. In FIG. 7, the control signals are shown being transmitted (shown as 716a and 716b) to the "IO Terminal Block 3 (Slave)" 104c and "IO Terminal Block 4 (Slave)" 104d. In other embodiments, e.g., where the output IO is specified at only a subset of the IO Terminal Blocks, the control signals are transmitted, via the IO backplane bus 108, to the IO Terminal Blocks with the output IO. In some embodiments, the "IO Terminal Block 2 (Master)" 104b includes all output IOs—to this end, the "IO Terminal Block 2 (Master)" 104b generates the output via the field circuitries located therein and does not transmit control signals to other IO terminal blocks in the functional IO slice group 110.

As further shown in FIG. 7, the IO Terminal Block 2 (Master)" 104b transmits (718), via the local backplane bus 106, status feedback data to the head unit 102. The status feedback data may include, but not limited to, health feedback, monitoring, and diagnostics data. The status feedback may be a part of a second control loop (a slower control loop) with the head unit 102 or global controller 112. As shown in FIG. 7, the IO Terminal Block 2 (Master)" 104b processes (720) the status feedback data and transmits (722) an updated target-regulation command.

The control-loop for the functional IO slice group 110 may execute in parallel to, or in conjunction with, a third control loop 726 executed with the "IO Terminal Block 1" 104a. The third control loop 726 may include a feedback data received (728) at the head unit 102 from, e.g., the "IO Terminal Block 1" 104a. The head unit 102 may process (730) the feedback data and provide (732) an output of the "IO Terminal Block 1" 104a.

Figure 8:
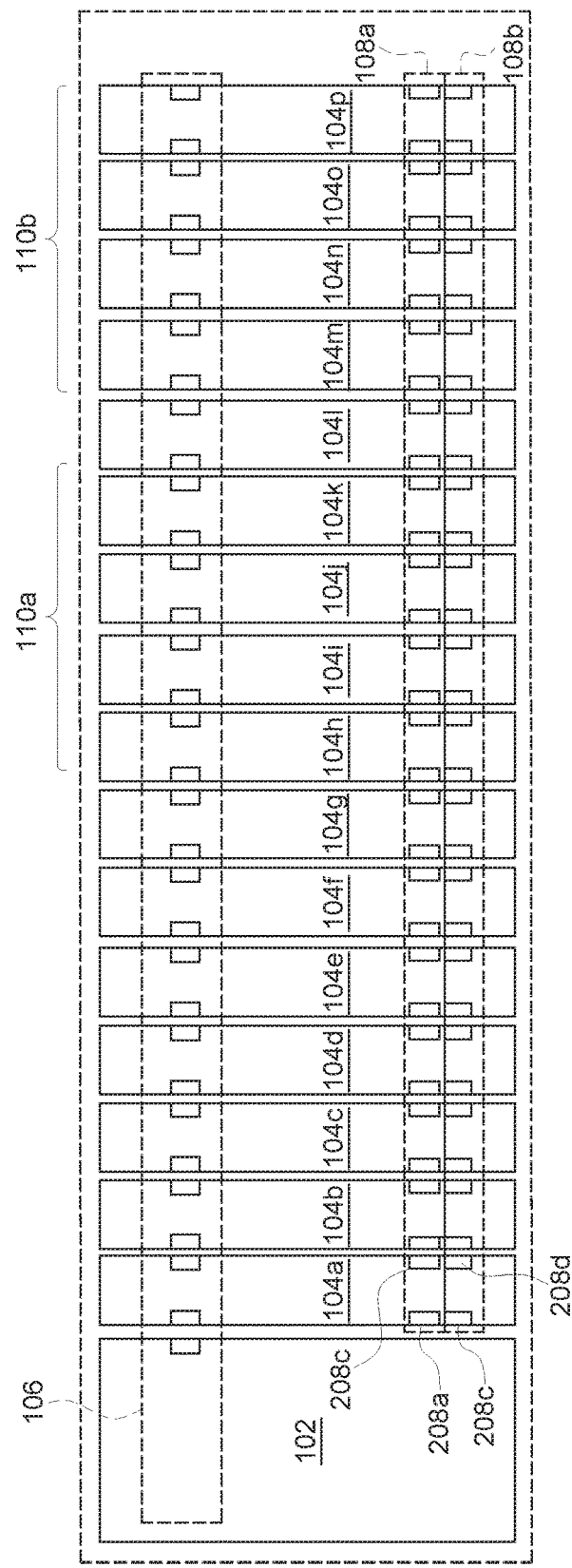
FIG. 8 illustrates example control IO devices of FIG. 1 configured with multiple modular IO terminal blocks, in accordance with an illustrative embodiment.

FIG. 8 illustrates example control IO devices 100 of FIG. 1 configured with multiple modular IO terminal blocks, in accordance with an illustrative embodiment. As shown in FIG. 8, the control IO device 100 includes a head unit 102 operatively coupled to a plurality of modular IO terminal blocks 104 (shown as 104a, 104b, 104c, 104d, 104e, 104f, 104g, 104h, 104i, 104j, 104k, 104l, 104m, 104n, 104o, and 104p). Each of the modular IO terminal blocks 104 includes two or more IO backplane bus connectors 208 (shown as 208a, 208b, 208c, and 208d) that forms multiple IO backplane buses 108 (shown as 108a and 108b) when the modular IO terminal blocks 104 are assembled together. The modular IO terminal blocks 104 may include i) three or more IO backplane bus connectors 208 to form a third IO backplane bus (e.g., a third serial IO backplane bus), four or more IO backplane bus connectors 208 to form a fourth IO backplane bus (e.g. a fourth serial IO backplane bus), five or more IO backplane bus connectors 208 to form a fifth IO backplane bus (e.g., a fifth serial IO backplane bus), and etc.

Referring still to FIG. 8, the formed IO backplane bus 108 spans the length of the modular IO control blocks. In some embodiments, each IO backplane bus 108 is used for a given functional IO slice group 110. As a non-limiting example, a first functional IO slice group 112a is formed, in FIG. 8, via modular IO control blocks 104h, 104i, 104j, and 104k over IO backplane bus 108a, and a second functional IO slice group 112b is formed via modular IO control blocks 104m, 104n, 104o, and 104p over IO backplane bus 108b. The functional IO group 110 is formed via configuration profiles provided to the modular IO terminal blocks that configures, e.g., the field circuitries located therein and the IO backplane bus controllers.

In some embodiments, a single functional IO slice group 112 can be configured to communicate over two or more IO backplane buses 108.

Figure 9:
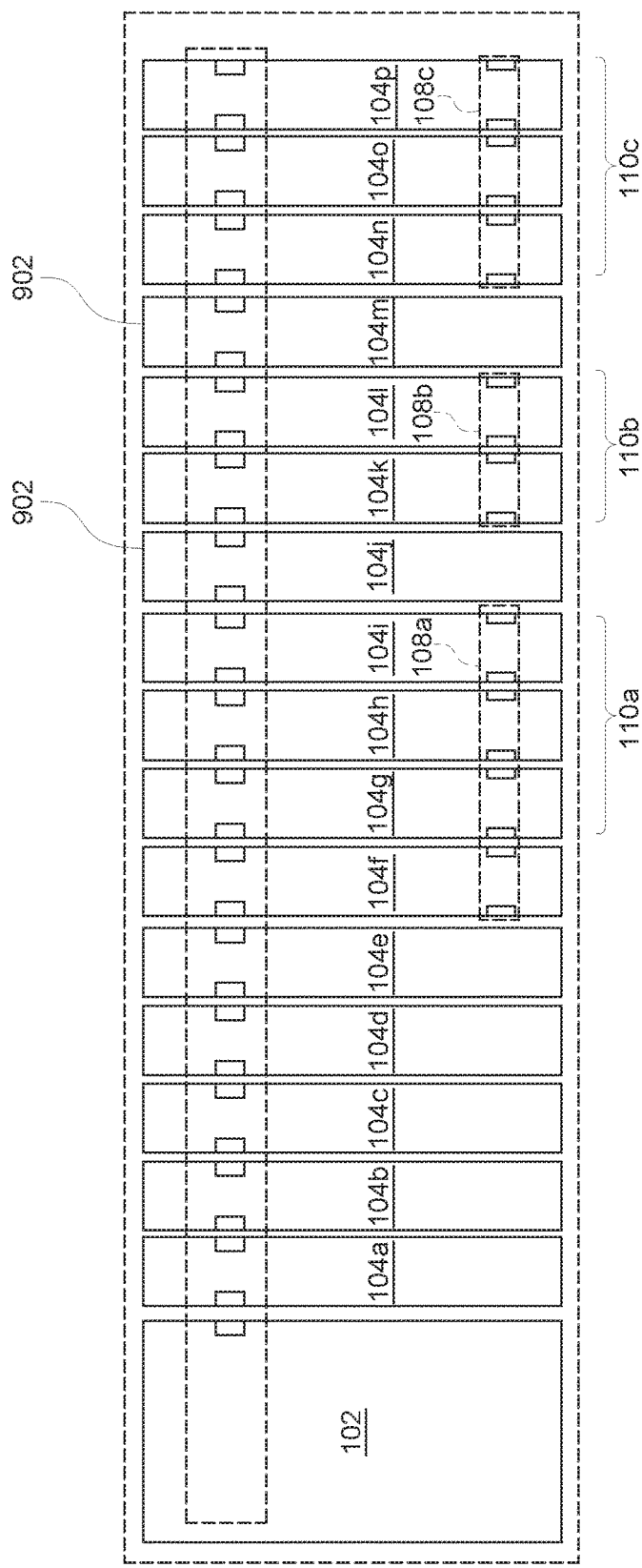
FIG. 9 illustrates another example of the control IO devices of FIG. 1 configured with multiple IO terminal blocks, in accordance with another illustrative embodiment.

FIG. 9 illustrates another example of the control IO devices 100 of FIG. 1 configured with multiple IO terminal blocks, in accordance with another illustrative embodiment.

As shown in FIG. 9, certain modular IO terminal blocks 104 includes IO backplane bus connectors 208 (shown as 208a, 208b) that forms the IO backplane bus 108.

Also shown in FIG. 9, more than one functional IO slice groups 110 (shown as 110a, 110b, 110c) can be formed by the placement of a modular IO terminal block 902 that does not include the IO backplane bus connectors 208. As a non-limiting example, a first functional IO slice group 112a is formed, in FIG. 9, via modular IO control blocks 104g, 104h, and 104i over IO backplane bus 108a; a second functional IO slice group 112b is formed via modular IO control blocks 104k and 104l over IO backplane bus 108b; and a third functional IO slice group 112c is formed via modular IO control blocks 104n, 104o, 104p over IO backplane bus 108c.

The functional IO slice group 110 is defined, in part, by the IO backplane bus 108, and also by instructions. As shown in FIG. 9, the functional IO slice group 110a is formed of modular IO control blocks 104g, 104h, and 104i even though an IO backplane bus 108a is also established with modular IO control blocks 104f.

Example IO Control Device with Attachable Control Components

Figure 10:
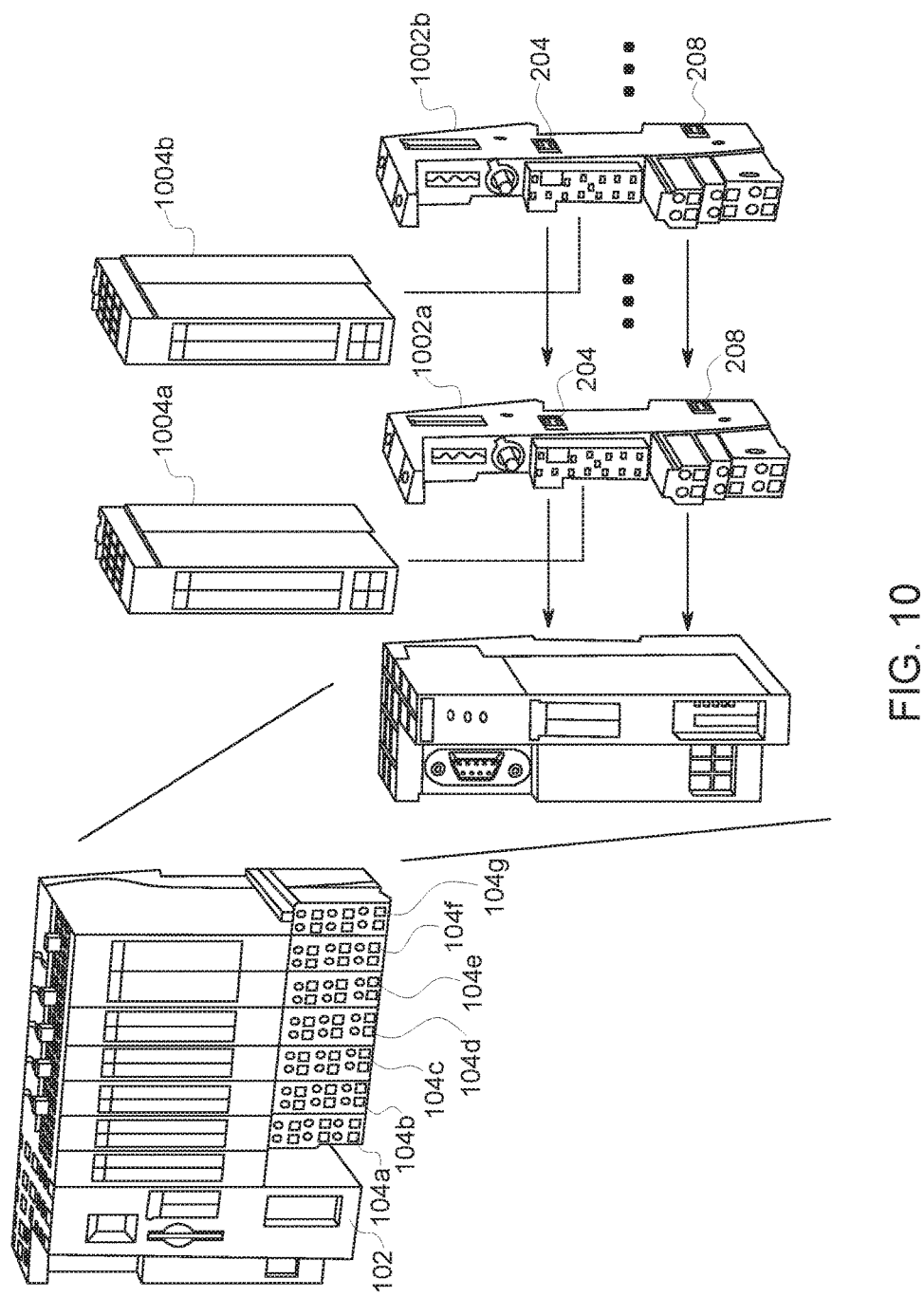
FIG. 10 illustrates an example IO control device that includes a head unit and modular IO terminal blocks configured to attach to one another to form an IO Backplane bus and to form a functional IO slice group, as described in relation to FIGS. 1 and 2, in accordance with another illustrative embodiment.

FIG. 10 illustrates an example IO control device 100 that includes a head unit 102 and modular IO terminal blocks 104 (shown as 104a, 104b, 104c, 104d, 104e, 104f, and 104g) configured to attach to one another (as stackable or connectable elements) to form an IO Backplane bus 108 and to form a functional IO slice group 110, as described in relation to FIGS. 1 and 2, in accordance with another illustrative embodiment.

FIG. 10 illustrates an example IO control device assembled from a head unit and modular IO terminal blocks, as described in relation to FIGS. 1 and 2, that is configured to releasably attach to an attachable control component, in accordance with another illustrative embodiment. As shown in FIG. 10, the modular IO terminal comprises a block component 1002 (shown as 1002a and 1002b) that includes receptacles to releasably couple to a module component 1004 (shown as 1004a and 1004b). As shown in FIG. 10, the block component 1002 includes one or more connectors 208 to couple to corresponding connectors in nearby block components to form the IO backplane bus 108. In other embodiments, the one or more connectors 208 are located in the module component 1004.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

Various embodiments of the disclosure may include one or more special purpose computers, systems, and/or particular machines that facilitate the receipt, processing, and/or output of analog and/or digital data. A special purpose computer or particular machine may include a wide variety of different software modules and/or computer-implemented or computer-executable instructions in various aspects. As explained in greater detail below, in certain aspects, these various software components may be utilized to facilitate the operation of an IO circuit and/or the processing of received analog or digital data.

What is claimed is:

1. A modular apparatus for use in a control system, the control system having a head unit and a plurality of modular IO (Input/Output) terminal blocks providing IOs for industrial controls, the modular apparatus comprising:
   a housing having one or more IO terminals, the one or more IO terminals being configured to provide IO for control of one or more industrial controllers;
   a first connector configured to releasably couple to a corresponding first connector of an adjacent modular IO terminal block of the plurality of modular IO terminal blocks, to form a first backplane bus that electrically connects the modular apparatus with the head unit and the plurality of modular IO terminal blocks so as to provide communication therewith; and
   a second connector configured to releasably couple to a corresponding second connector of the adjacent modular IO terminal block to form a second backplane bus that electrically connects the modular apparatus with the adjacent modular IO terminal block so as to provide communication therewith, wherein the modular apparatus and the adjacent modular IO terminal block, collectively, form a collective IO module configured to a provide an interface to an industrial controller, wherein the second backplane bus communicatively spans among two or more of the plurality of modular IO terminal blocks and not with the head unit.

2. The modular apparatus of claim 1 comprising:
   a processor; and
   a memory having instruction stored thereon, wherein the instructions, when executed by the processor, cause the processor to:
      receive a first command via the first backplane bus, the first command being associated with the collective IO module; and
      in response to the receipt of the first command, transmit a second command to the adjacent modular IO terminal block via the second backplane bus.

3. The modular apparatus of claim 1 comprising:
   a processor; and
   a memory having instruction stored thereon, wherein the instructions, when executed by the processor, cause the processor to:
      receive a first command via the first backplane bus, the first command being associated with configuration of the collective IO module, collectively formed the adjacent modular IO terminal block and an additional modular IO terminal block of the plurality of modular IO blocks, wherein each of the adjacent modular IO terminal block and the additional modular IO terminal block receives a respective second and third command associated with configuration of the collective IO module; and
      in response to the receipt of the first command, transmit one or more second commands to the adjacent modular IO terminal block and the additional modular IO terminal block via the second backplane bus.

4. The modular apparatus of claim 1 comprising:
   a processor; and
   a memory having instruction stored thereon, wherein the instructions, when executed by the processor, cause the processor to:
      receive IO data, via the second backplane bus, from the adjacent modular IO terminal block; and
      process the IO data and transmit control data, via the second backplane bus, to the adjacent modular IO terminal block.

5. The modular apparatus of claim 1 comprising:
   a processor; and
   a memory having instruction stored thereon, wherein the instructions, when executed by the processor, cause the processor to:
      receive IO data, via the second backplane bus, from the adjacent modular IO terminal block; and
      process the IO data and output a control signal via the IO terminals.

6. The modular apparatus of claim 1 comprising:
a processor; and
a memory having instruction stored thereon, wherein the instructions, when executed by the processor, cause the processor to:
receive IO data, via the second backplane bus, from the adjacent modular IO terminal block; and
process the IO data and output a status signal via the first backplane bus, to the head unit.

7. The modular apparatus of claim 1, wherein the first backplane bus is located in a bus housing, the bus housing having one or more connectors to couple to an external face of the modular apparatus and the adjacent modular IO terminal block.

8. The modular apparatus of claim 1, wherein the second connector includes a right second connector and a left second connector each located on a respective side of the housing of the modular apparatus to form the second backplane bus.

9. The modular apparatus of claim 1,
wherein the first backplane bus is selected from the group consisting of a fieldbus, a VME bus, a PCI bus, a PCI-express bus, PCIX-express bus, a PC-104 bus, an ISA bus, an Ethercat bus, a RS-485 bus, a CAN (controller area network) bus, a Genius bus, and a ControlNet bus, and
wherein the second backplane bus is selected from the group consisting of the fieldbus, the VME bus, the PCI bus, the PCI-express bus, the PCIX-express bus, the PC-104 bus, the ISA bus, the Ethercat bus, the RS-485 bus, the CAN (controller area network) bus, the Genius bus, and the ControlNet bus.

10. The modular apparatus of claim 1, wherein the collective IO module comprises an additional modular IO terminal block.

11. The modular apparatus of claim 1, wherein the interface to the industrial controller is associated with an interface selected from the group consisting of:
a position regulator with a single position feedback;
a pulse rate regulator with a single pulse rate feedback;
a pilot cylinder regulator with two position feedback;
a position regulator comprising two feedbacks;
a pulse rate regulator with two pulse rate feedbacks;
a position regulator configured to median select from three inputs;
a position regulator configured to select from two ratiometric pairs; and
a pilot cylinder regulator with four position feedbacks.

12. The modular apparatus of claim 1, wherein the first backplane bus has a first data rate and the second backplane bus has as second data rate, the second data rate being different than the first data rate.

13. A system comprising:
a head unit; and
a plurality of input/output (IO) slice modules, including a first IO slice module, a second IO slice module, and a third IO slice module, that collectively form a slice IO system,
wherein the first IO slice module comprises a first modular IO terminal block that includes a first set of one or more IO terminals to provide IO for control of a plurality of industrial controllers, the first modular IO terminal block comprising a first housing having a first connector configured to releasably couple to i) a corresponding first connector, located in a second modular IO terminal block of the second IO slice module and ii) an additional corresponding first connector, located in a third modular IO terminal block of the third IO slice module, to form, in whole, or in part, a first backplane bus that electrically connects the first IO slice module with the head unit;
wherein the second IO slice module comprises the second modular IO terminal block that includes a second set of one or more IO terminals to provide IO for control of the plurality of industrial controllers, the second modular IO terminal block comprising a second housing having the corresponding first connector to couple to the first connector of the first modular IO terminal block to form the first backplane bus;
wherein the third IO slice module comprises the third modular IO terminal block that includes a third set of one or more IO terminals to provide IO for control of the plurality of industrial controllers, the third modular IO terminal block comprising a third housing having the additional corresponding first connector to couple to the first connector of the first modular IO terminal block to form the first backplane bus; and
a second backplane bus that communicatively spans among the first, second, and third modular IO terminal block and not with the head unit, wherein the first modular IO terminal block is configured to:
receive, via the second backplane bus, IO data from the second and third modular IO terminal blocks; and
transmit, via the second backplane bus, control data to the second and/or third modular IO terminal blocks or transmit status data, via the first backplane bus, to the head unit.

14. The system of claim 13, wherein the first modular IO terminal block comprises:
a processor; and
a memory having instructions stored thereon, where in the instructions, when executed by the processor, cause the processor to:
receive a first command via the first backplane bus, the first command being associated with configuration of the first modular IO terminal block as a part of the slice IO system; and
in response to the receipt of the first command, transmit a second command to the second and the third modular IO terminal block via the second backplane bus.

15. The system of claim 13, wherein the first backplane bus has a first data rate and the second backplane bus has as second data rate, the second data rate being different than the first data rate.

16. The system of claim 13, wherein the second backplane bus is located in a bus housing, the bus housing having one or more connectors to couple to an external face of the first modular IO terminal block, the second modular IO terminal block, and the third modular IO terminal block.

17. The system of claim 13, wherein the first housing of the first modular IO terminal block further comprises a second connector including a right second connector and a left second connector each located on a respective side of the first housing to form the second backplane bus.

18. The system of claim 13,
wherein the first backplane bus is selected from the group consisting of a fieldbus, a VME bus, a PCI bus, a PCI-express bus, PCIX-express bus, a PC-104 bus, an ISA bus, an Ethercat bus, a RS-485 bus, a CAN (controller area network) bus, a Genius bus, and a ControlNet bus, and
wherein the second backplane bus is selected from the group consisting of the fieldbus, the VME bus, the PCI bus, the PCI-express bus, the PCIX-express bus, the PC-104 bus, the ISA bus, the Ethercat bus, the RS-485 bus, the CAN (controller area network) bus, the Genius bus, and the ControlNet bus.

19. A method of operating an industrial controller having a first backplane bus between a head unit and a plurality of a modular IO (Input/Output) terminal blocks, the method comprising:

receiving, from a head unit, at a first modular IO terminal block, via the first backplane bus, a first command associated with configuration of the modular IO terminal block as a collective IO module, wherein the collective IO module is collectively formed of the first modular IO terminal block, a second modular IO terminal block, and a third modular IO terminal block; and establishing, in response to the first command, at the first modular IO terminal block, a connection with each of the second modular IO terminal block and the third modular IO terminal block over a second backplane bus, wherein subsequent run-time control-loop among the first modular IO terminal block, the second modular IO terminal block, and the third modular IO terminal block, as the collective IO module is conducted over the second backplane bus, wherein the second backplane bus communicatively spans among the first modular IO terminal block, the second modular IO terminal block, and the third modular IO terminal block, and not with the head unit.

* * * * *